May 3, 1960

R. M. G. BOUCHER 2,935,375

METHOD OF PURIFYING A GASEOUS CURRENT CONTAINING AN AEROSOL

Filed Feb. 17, 1956

United States Patent Office 2,935,375
Patented May 3, 1960

2,935,375

METHOD OF PURIFYING A GASEOUS CURRENT CONTAINING AN AEROSOL

Raymond Marcel Gut Boucher, Neuilly-sur-Seine, France, assignor to Gulton Industries, Inc., Metuchen, N.J., a corporation of New Jersey Application February 17, 1956, Serial No. 566,244

1 Claim. (Cl. 23—2)

The present invention relates in general to methods and means for treating atmospheres or gaseous currents and more particularly to a method of and an apparatus for treating atmospheres or gaseous currents, this method consisting broadly in introducing into the gaseous flow to be scrubbed or cleaned a liquid aerosol or micro-mist of which the average diameter $d_{vs}$ is equal to that of the aerosol to be eliminated. The average diameter concerned is that defined by Sauter's formula as being the relation of $\Sigma nd^3$ to $\Sigma nd^2$. The production of liquid aerosols having a known $d_{vs}$ can be effected by using the micro-mist generators described hereafter.

By properly regulating the ratio of the liquid output to the volume of gas employed for atomizing purposes $d_{vs}$ values useful for carrying out this invention may be obtained by applying with the atomizers described hereafter the well-known formula of Tanasawa and Nukiyama, $$d_{vs} = \frac{585\sqrt{\sigma}}{v\sqrt{\rho}} + 597\left(\frac{\mu}{\sqrt{\sigma\rho}}\right)^{0.45}\left(1,000\frac{Q_e}{Q_a}\right)^{1.5}$$

in which $v$ = relative velocity between the gaseous current and the liquid flow (in meters/second);

$Q_e/Q_a$ = ratio of liquid output to air output under "vena contracta" conditions;

$\rho$ = density of the liquid in grams/cc.;

$\mu$ = viscosity of liquid (in poises);

$\sigma$ = surface tension (in dynes/cm.)

It is another object of this invention to introduce the aerosol having a suitable diameter into a volumetric proportion which is a function of the solid or liquid micro-particles to be associated, dissolved or caused to react with one another. A few minimum values of this coefficient $\Omega$ are given hereafter by way of indication, this coefficient representing the ratio of the volume of aerosols to be introduced into the gaseous current to the volume of the suspension to be treated.

Coefficient $\Omega = 1$ for dispersions having an average diameter greater than 100 microns.

$\Omega \geq 2$ for dispersions having a diameter $> 25\mu$;
$\Omega \geq 5$ for dispersions having a diameter $> 10\mu$;
$\Omega \geq 10$ for dispersions having a diameter $> 1\mu$;
$\Omega \geq 25$ for dispersions having a diameter $> 0.5\mu$;
$\Omega \geq 100$ for dispersions having a diameter $> 0.1\mu$;

The operational time required for carrying out a very complete scrubbing or cleaning between dispersed phases may be obtained automatically through the treatment in the apparatus described hereafter.

This apparatus for treating gases and atmospheres is characterized by the combination and series interconnection of the following three elements:

(a) A Venturi tube with means for axially injecting an aerosol or a micro-mist therein;

(b) A centrifugal separator of the cyclone or multicyclone type;

(c) A tower with inner baffle means or obstacles permitting a more or less extended stay of the elements undergoing a reaction, or a conventional electro-precipitator of the Cottrel type, or a tower in which the substances are agglomerated by using sound waves.

The attached drawings forming part of this specification illustrate diagrammatically by way of example different forms of embodiment of an apparatus constructed in accordance with the teachings of this invention. In the drawings:

Figure 4 is a sectional view showing on a considerably larger scale a micro-mist generator.

Figure 5 is a similar view showing a water atomizer.

Figures 8 and 9 are side and cross-sectional views respectively of an equipment comprising three atomizers arranged in parallel.

Figure 1:
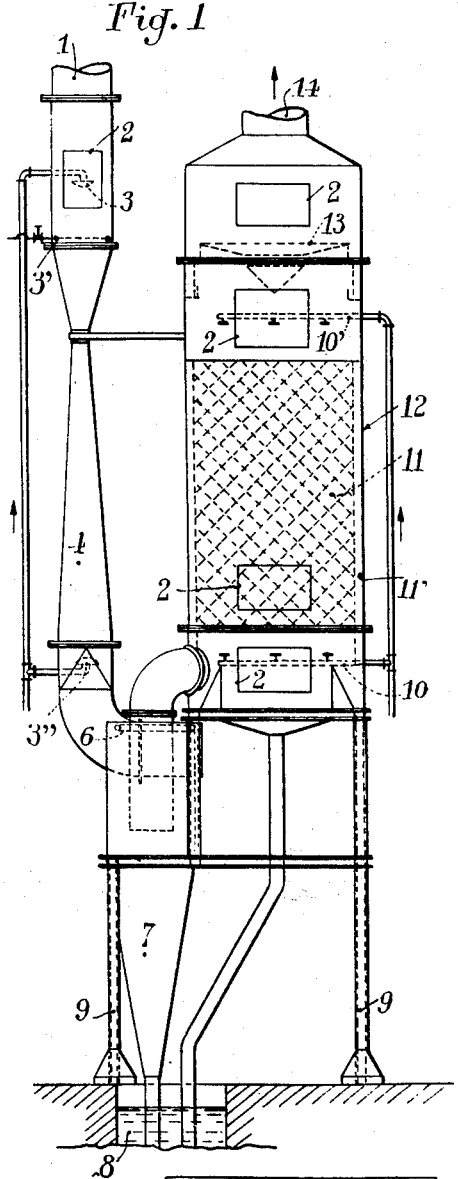
Figures 1, 2 and 3 are side, front and plane views respectively of a first embodiment.
Figure 2:
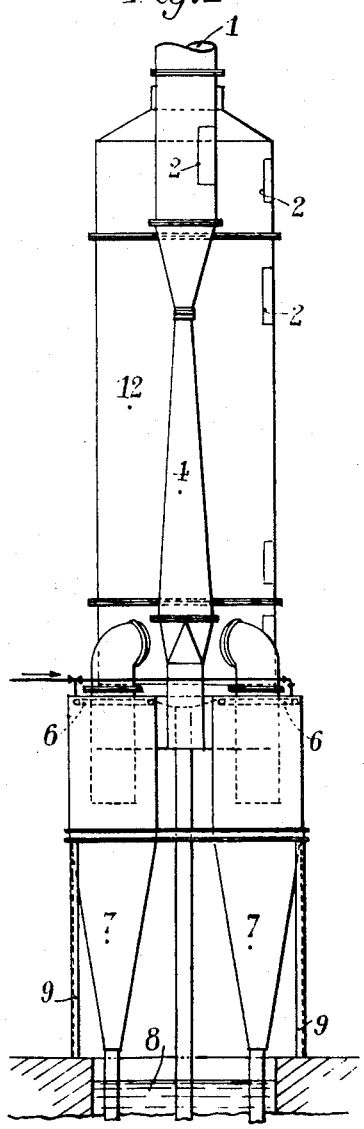
Figure 3:
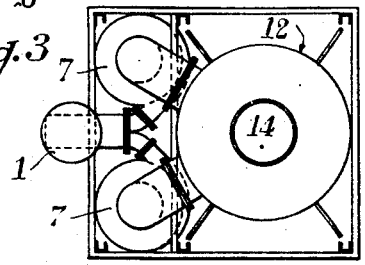

The apparatus shown in Figs. 1 to 3 comprises an inlet duct 1 through which the gaseous current to be treated is fed to the apparatus. This current is drawn through convergent-divergent or Venturi tube 4 by an atomizing or pulverizing unit 3, a man-hole 2 being provided at the level of this unit 3 and the latter comprising aerosol generators or micro-mist generators adapted to produce a jet of fine liquid particles. The physical characteristics of the fine particles ejected by this unit 3 through the Venturi tube 4 meet the requirements set forth hereinabove as to their number of particles per unit of volume and their size distribution. The flow of aerosols introduced upstream of the Venturi tube will accelerate the gaseous output to be treated in the apparatus and moreover it will create a strong turbulence to thoroughly mix the gas to be cleaned with the coagulating or dissolving aerosols.

The Venturi tube 4 is of the conventional type with a total angle of cone ranging from 20° and 45° in the convergent portion and from 4° to 14° in the divergent or diffuser portion. It will be noted however that in view of reducing the pressure losses in the assembly it may be well to construct the Venturi tube by assembling successively a plurality of serially-disposed frustoconical elements of adequate, progressively increasing or decreasing taper. The Venturi tube is so calculated that the increase in static pressure between the narrowest cross-section and the diffuser outlet be sufficient to completely evaporate the micro-droplets or liquid layers which might condense upstream of this narrowest cross-section due to the theoretically moderate cooling resulting from the decrease in static pressure in the convergent portion of the Venturi tube. Actually, the Aerojet tube in which an aerosol having reactive (dissolving or agglutinant) properties is projected will act integrally due to the phenomena of impact (shocks between corpuscles), diffusion (Brownian movement), or electrification (action produced by electrostatic or induced charges).

Figures 4, 5:
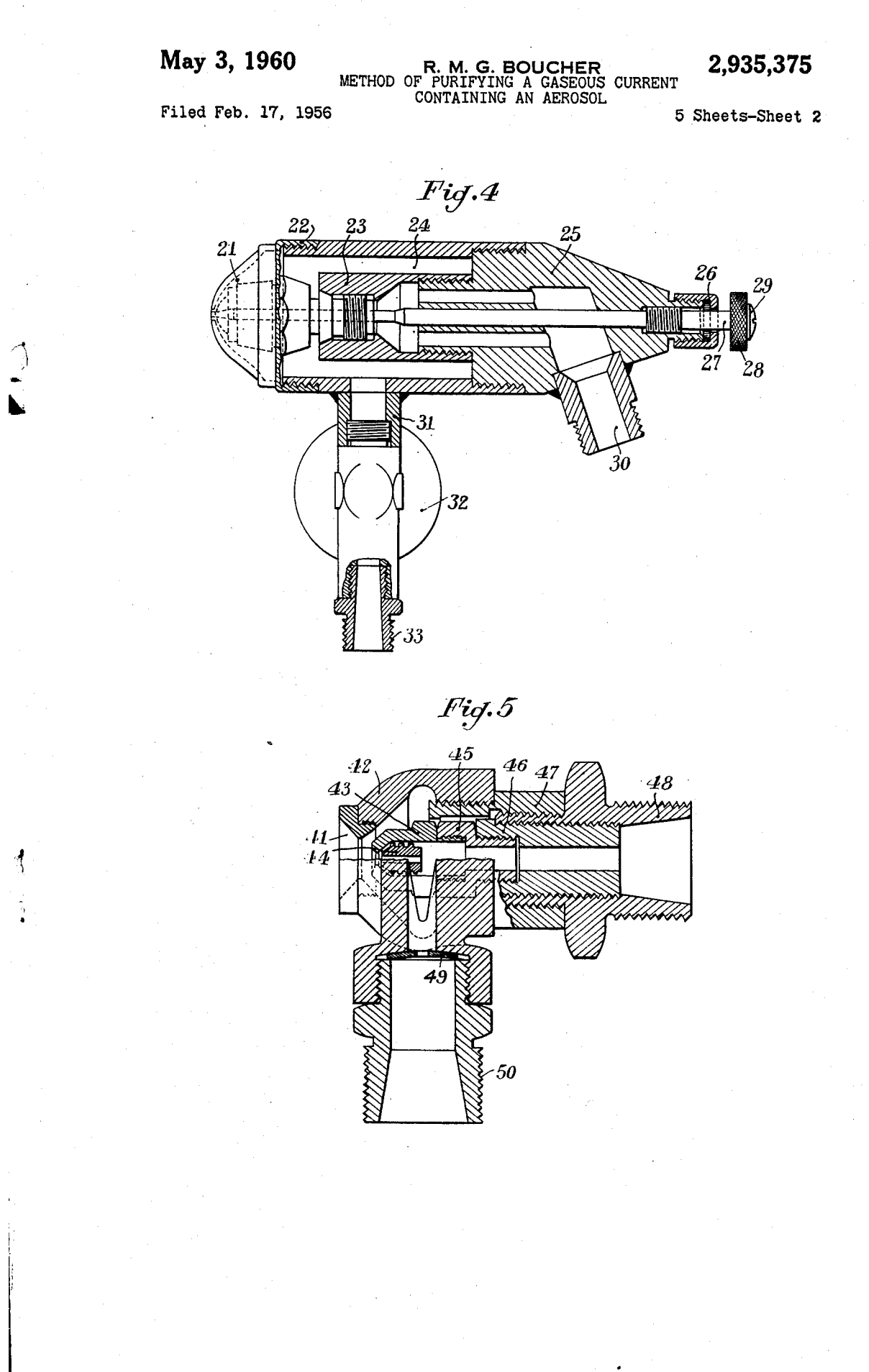

The atomizers suitable for carrying this invention may be of different types, and Figs. 4 and 5 illustrate two types which proved to be completely satisfactory in the practice.

The micro-mist generator illustrated in Fig. 4 comprises an air ejector 21 formed with a fixation ring 22, a nozzle carrier 23 mounted coaxially in the compressed-air chamber 24 having its inner end closed by a liquid distributor 25 carrying at its rear end a gland or like sealing means 26 to permit the fluid-tight passage of a needle valve 27 controlled through a knurled button 28 secured in position by a screw 29; the liquid is fed to the distributor 25 through a tubulure or pipe-fitting 30 and the compressed air is fed through a tubulure 31 connected through a needle-valve cock 32 to a pipe union 33.

The water atomizer illustrated in Fig. 5 comprises a diffuser 41 adapted to produce a conical jet and secured on the body 42 of the device; the nozzle 43 has coaxially mounted therein a hydraulic whirl 44 and is carried by an adaptor 45 carried in turn by an adjustment sleeve 46 and a socket 47; the liquid is fed through the coaxial union 48 and the gases flow through the washer 49 held in position by another union 50.

The compressed gas to be used in the atomizing process is forced through a narrow circular orifice by which it is imparted a nozzle effect. The gas velocity may attain supersonic values under certain conditions of operation. The micro-mist generating device shown in Fig. 4 was operated quite successfully when liquid dispersions having an average diameter equal to or higher than 15 microns had to be used.

Figure 8:
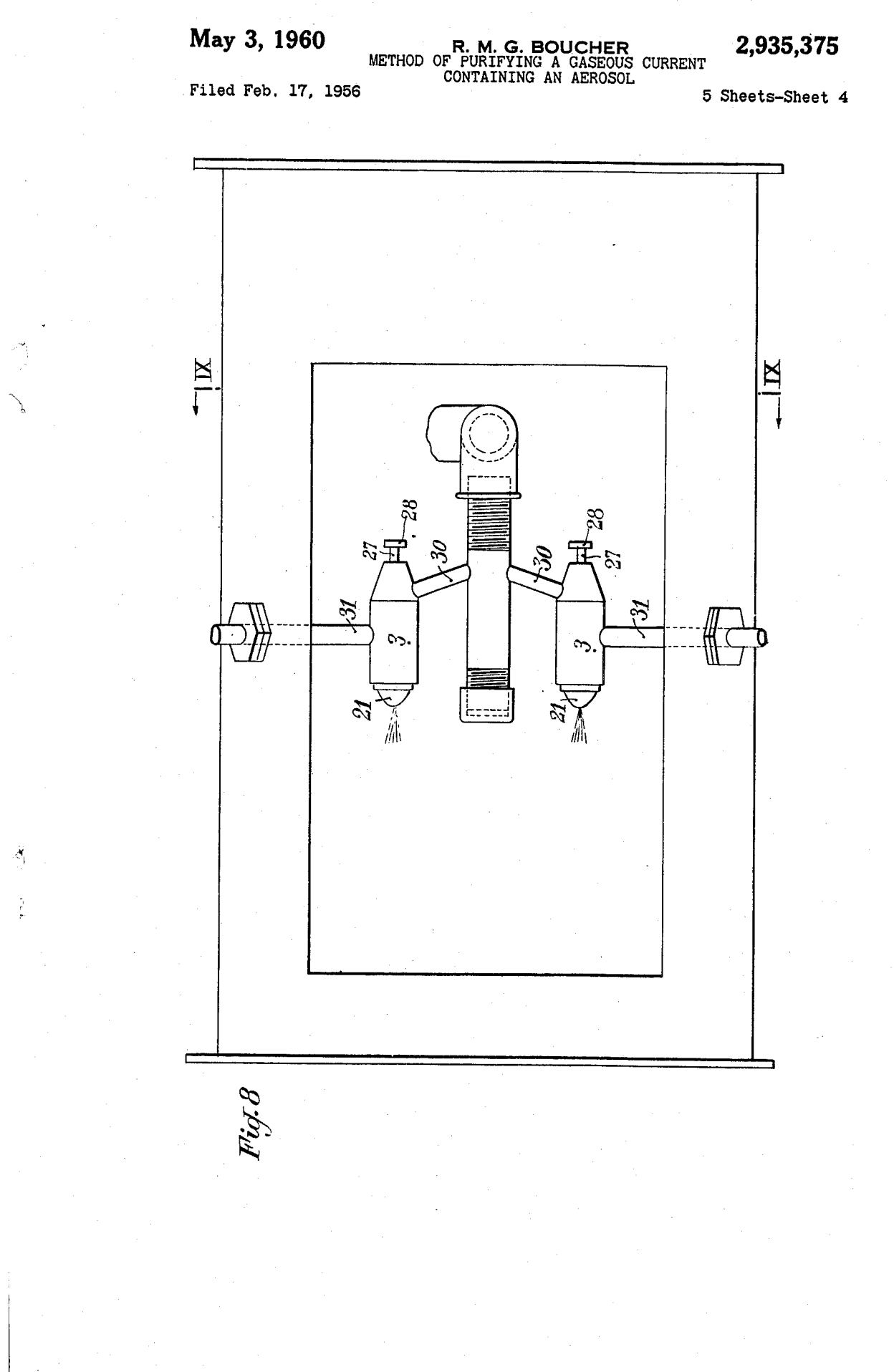
Figure 9:
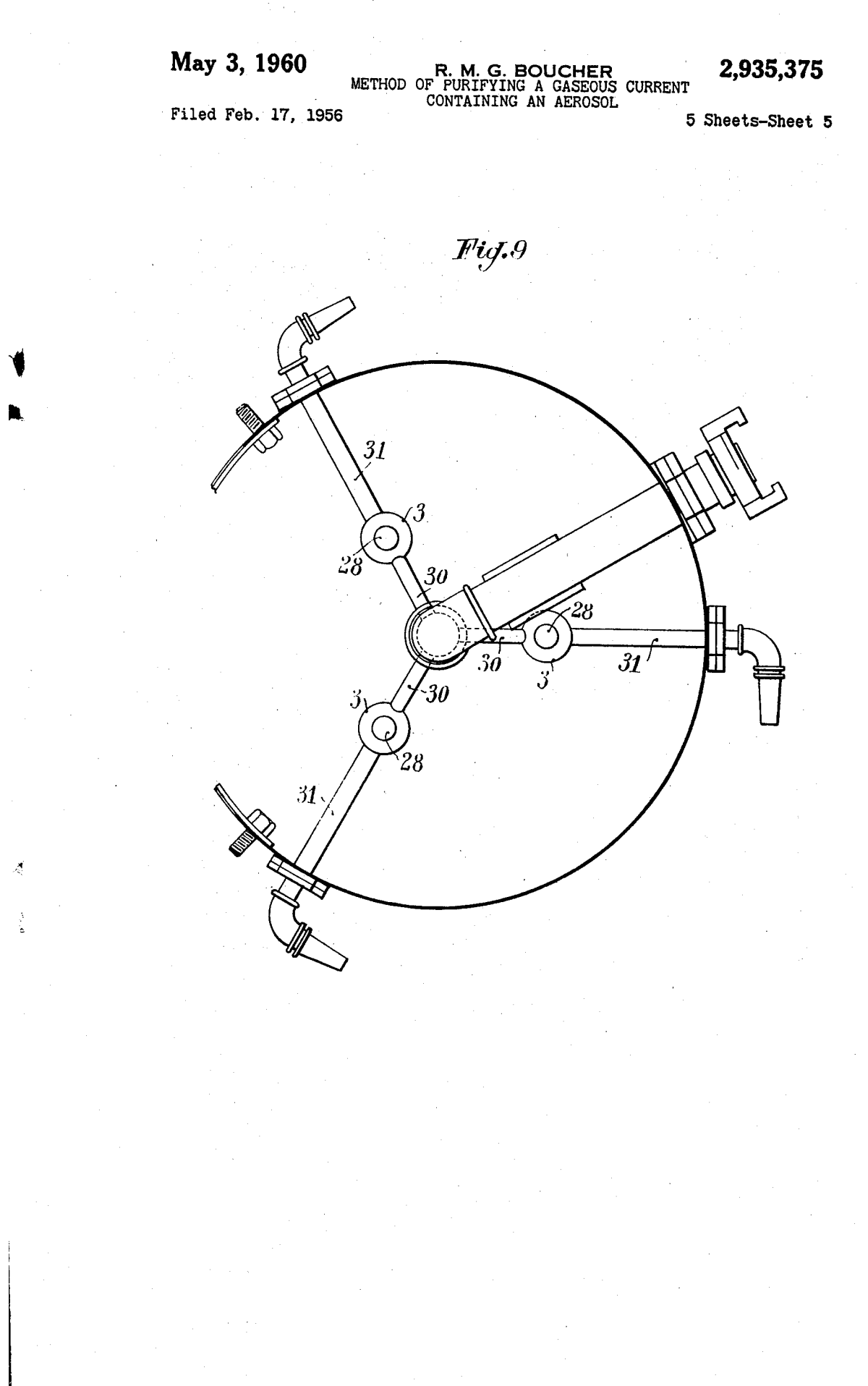

It will be noted that in this case a strong whirling movement is imparted to both gaseous and liquid streams in order to accelerate and promote the fractionation of the droplets and to form a mist cone having an angular value ranging from 10° to 35°. The atomized liquid output is adjusted by means of a valve of any adequate design, disposed upstream of the generator. Of course, a high-output mist forming atomizer or a plurality of atomizers having a lower output may be employed by using for example a fixation arrangement of the type illustrated in Figs. 8 and 9.

On the other hand, the aerosol generators may be secured as illustrated in these figures with a view to permit an easy access for cleaning and adjustment purposes.

Moreover, the Venturi tube is characterized by the provision of an annular liquid-distributing ramp 3' adapted to supply a quantity of washing liquid sufficient to protect the walls when required by forming thereon a liquid film flowing downwards along the Venturi tube diffuser. The velocity of flow of the gaseous stream at the neck portion of the Venturi tube ranges between the extreme values of 20 m./sec. and 150 m./sec.

Directly at the outlet of the divergent portion of the Venturi tube, and coaxially thereto, one or a plurality of atomizers 3" are mounted in the passage in counter-current relationship to the Venturi tube, instead of being arranged in a chamber. The purpose of these aerosol generators is to intensify the mixing of the phases to be treated, and also to accelerate the agglutinating shocks between particles.

The gases to be cleaned or scrubbed are subsequently led through one or more cyclones 7 which may be disposed in parallel as shown in the arrangement illustrated. Due to the whirling movement created within centrifugal separators and to the difference between the respective paths followed by the corpuscles or agglutinates of the different masses involved, a great number of collisions between particles take place. These shocks—most of which are non-elastic—promote the rupture of the layers of protective gas surrounding the liquid micro-droplets and as a result the adsorption of the gaseous molecules to be eliminated is accelerated. It will be readily understood that in the case of agglomerating solid or liquid particles contained in the gaseous stream the dust particles or vesicles previously grown heavier and agglutinated by their whirling passage through the Venturi tube will subsequently coagulate very easily as their spiroid paths interfere with one another in the cyclone or cyclones.

On the other hand, the upper portions of the centrifugal collectors 7 are also provided with a ramp 6 for emitting a fluid which subsequently flows down along their walls to protect them against any excessive deposit of materials collected therein. Then the apparatus will eliminate any particles of which the increase in size or the dissolution did not attain sufficient values during their passage through the Venturi tube 4 and centrifugal collector 7. The gases issuing from the exhaust duct of the cyclones or multicyclones are led immediately to the bottom of a contact tower 12 carried by uprights 9 and wherein the aforesaid phenomena of dissolution and shock-agglomeration are further extended. This tower comprises in its lower portion a circular ramp 10 having its atomizing nozzles directed partly parallel to the gaseous flow and partly in counter-current relationship thereto, i.e. in the direction of the gases issuing from the cyclones. The filtering material 11 of this tower may consist of coke, bricks, glass balls, glass wool or Raschig rings.

By filling this tower with obstacles of various character it is possible to increase considerably the time during which the reacting compounds remain therein, so that the phenomena of "balancing" or agglutination may take place completely. Thus, the size of solid dust particles having an average diameter of 0.1 micron may be increased up to 2 microns at the cyclone outlet. An extended stay in the filtering mass (for example coke) will then promote efficient shocks between these corpuscles due to the many changes in direction impressed thereto during their passage through the micro-channels and interstices of the coke structure. Therefore, this device makes it possible to retain fine suspensions which could not be collected by producing a passage through the Venturi tube and cyclones alone. This contact tower —which may be termed "diffusing tower"—possesses a double wall owing to the predominance of the diffusing phenomena (Brownian movement) during its operation. The inner wall consists of a grate, or a perforated sheet-metal element or plate containing the filling material, this wall being separated by a narrow gap of the order of a few millimeters from the outer wall of the tower. Thus, the washing fluid ejected in counter-current relationship by the atomizers of ramp 10' may flow back to the bottom of the apparatus through this narrow gap 11' (Fig. 1). The average rate of flow of the gaseous flow through the main cross-sectional area of the diffusing tower ranges from 0.25 m./sec. to 5 m./sec. At its upper portion the contact tower is provided with a centrifugal droplet-shield 13 of the blade type which is adapted to remove any liquid spherules having a diameter greater than 100 microns which might escape from the atomizers of the last stage. A plurality of man-holes 2 consisting of transparent or opaque panels are provided to permit the access to the inside of this tower to facilitate either the cleaning operations or the controls of the tower operation. The cleaned or scrubbed gases are expelled from the top of the tower through a duct 14 and the products to be recovered in solid or dissolved state are collected at 8 in a common sump provided at the bottom of the cyclone and diffusion tower unit.

Figure 6:
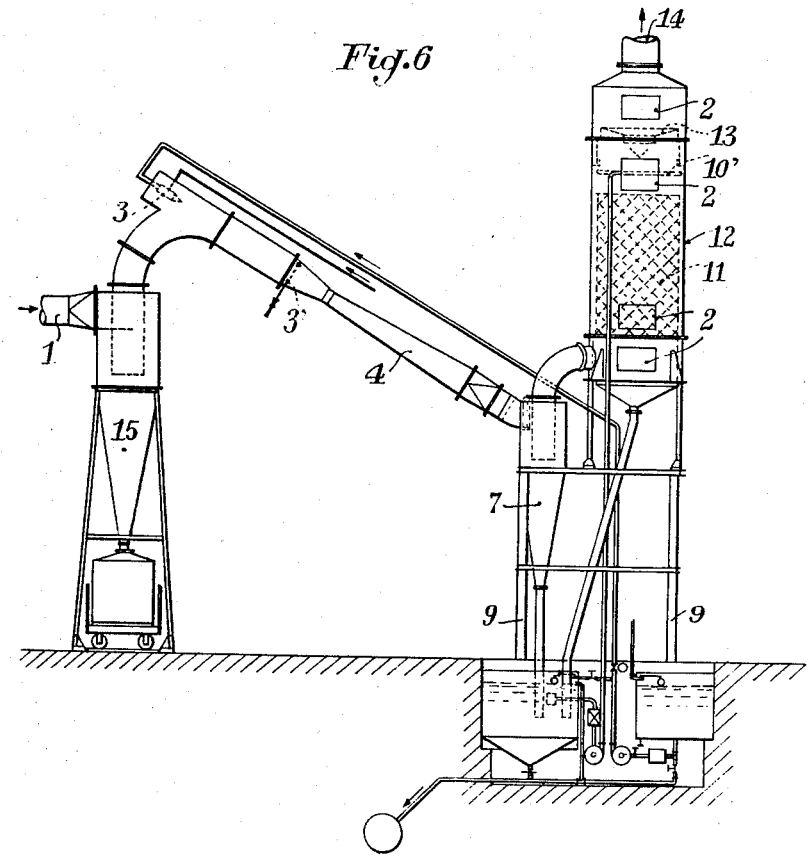
Figures 6 and 7 are side and plane views respectively of another embodiment.
Figure 7:
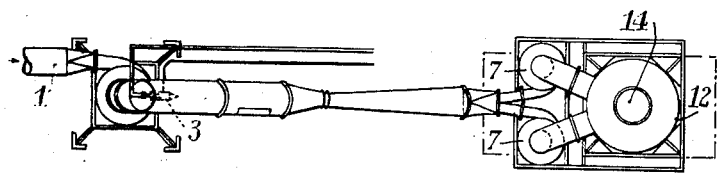

The modified apparatus illustrated in Figs. 6 and 7, wherein the same reference numerals designate the same or similar elements, differs from the preceding embodiment only in that it comprises a pre-cleaning cyclone 15 and that the divergent-convergent unit 4, instead of being arranged vertically, is set at 30° to the horizontal; the pre-cleaner is very useful in that it is more advantageous and efficient to operate with gaseous masses having low-particle-concentration values.

In certain cases it may be advantageous to separate the products collected at the bottom of the cyclones or multicyclones from those recovered from the last stage of the scrubber (diffusion tower or electro-precipitator). An arrangement of this character may be easily devised by anybody conversant with the art.

Of course, the micro-mist injected through the first stage of the cleaner may be charged electrostatically if this measure were likely to promote the efficiency of the assembly; various means may be employed to this end without departing from the spirit and scope of the invention. Thus, an electric field produced by the ring effect, by ionization of the gaseous flow, or by the use of radioactive products may be used, as well as many other known means.

EXAMPLES

There are described hereafter by way of example two specific cases of application of this invention. Of course, the dimensions and features of this experimental apparatus are given by way of indication and should not be construed as limiting the purpose and field of the invention.

Example No. 1

A gaseous current issuing from a drying oven is to be treated; its output rate is of the order of 5,000 cubic-meters per hour (175,000 cu. ft./hour) (calculated for 0° C. and 760 mm. of mercury) and contains 10 grams/cu. meter (0.28 gr. or 1 oz. per cu. ft.) of solid dust particles as well as certain detrimental gaseous compounds (such as sulfurous anhydride).

The cleaning device comprises firstly a pre-separating cyclone 15 adapted to reduce the corpuscle concentration of about 4 grams/cubic meter (0.113 gr. per cu. ft.) at the inlet end of the micro-mist forming Venturi tube 4. As the average diameter $d_{vs}$ of the solid aerosol is about 15 microns, a pair of atomizers 3 of the type illustrated in Fig. 4 are connected to the cyclone outlet, upstream of the convergent-divergent unit, respectively. These micro-mist generators have a consumption of about 100 litres/hour (26.42 U.S. gallons/hour) corresponding to a coefficient $\Omega=5$ circa. Both generators are mounted at a location permitting an easy access from the outside, for example as illustrated in Fig. 6. The Venturi tube 4 is calculated to provide neck flow speeds averaging approximately 90 m./sec. (295 ft./sec.). The consumption of compressed gas at 3.5 kilograms/sq. cm. (50 lbs./sq. in.) of each atomizer is of the order of 20 cubic meters/hour (700 cu. ft./hour) of gas under normal temperature and pressure conditions (i.e. 0° C. and 760 mm. of Hg). A pair of cyclones 7 are mounted in parallel at the very outlet of the convergent-divergent tube 4 set at 30° to the horizontal as already stated. The formation of a liquid sheet covering the inner walls of the Venturi tube will absorb a few litres-per-hour (or about one gallon/h.) of washing liquid. The micro-corpuscles flowing through the micro-mist forming Venturi tube are thus subjected to a strong turbulence promoting their agglutination and increase in size. A particle-removal yield of 95% (by weight) is found at the outlet of the pair of cyclones 7. The final diffusion tower 12 contains loose coke. The average velocity of gases through the cross-section of this tower is of the order of one metre/second. The liquid employed for dissolving the sulfurous anhydride consists of a basic solution of sodium carbonate, about 15 grams per litre (60 gr. per gallon). This solution serves also the purpose of cleaning the inner walls of the cyclones. The total consumption of basic solution is close to eight cubic-meters/hour (282 cu. ft./h.). The pressure drop produced in the convergent-divergent 4 is about 75 mm. of water under normal operating conditions and the pressure drop between the inlet of the Venturi tube and the outlet of the diffusion tower 12 is 300 mm. of water. A gas-scrubbing device of this type, constructed in accordance with the teachings of this invention, would have a total cleaning efficiency exceeding 99% for solid dust particles and 96% for noxious gaseous compounds.

Example No. 2

This installation is intended for scrubbing and reducing the flue gases escaping from aluminum-producing electrolytic tanks through the Söderberg method. Most of these smokes have an acid composition and have a substantial content of combustion products as well as tar, alumina oxide and cryolite vesicles. The particle concentration of the gas to be treated is about 15 grams/cubic-meters (0.425 gr./cu. ft.) and the gas output is about 10,000 cubic-meter (or 350,000 cut. ft.) per hour under the following conditions: 20° C. and 760 mm. of Hg.

The device comprises a pair of Venturi tubes (convergent angle=20°; divergent angle=5°) through which a sufficient quantity of liquid aerosols having an average diameter of the order of one micron are injected. These aerosols are obtained from a basic solution having a pH of about 9. The gases flow through the neck of the convergent-divergent devices at a rate of about 80 meter/sec. (260 ft./sec.). Each convergent-divergent device is followed by a pair of cyclones mounted in parallel. The four cyclones of the complete unit are connected to the bottom of a diffusion tower filled with ring-shaped elements of anti-acid porous material. The basic solution is sprayed into the tower of the last stage by using a pair of conventional atomizers of the type employing a liquid under pressure (1.5 to 2 kilograms per sq. cm.) (i.e. 20 to 28 p.s.i.). The total consumption of washing liquid is of the order of 15 to 20 cubic-meter (530 to 700 cu. ft.) per hour. A substantial fraction of the liquid used for the final atomizing or washing step is recycled by using a pump system adapted to draw the liquid from the solutions collected at the bottom of the cyclones and diffusion tower. The pressure loss produced throughout the installation is about 300 mm. of water. The scrubbing yield oscillated between 90 and 99% according to the operating conditions and these figures indicate both the recovery of solid products and the dissolution of noxious fluoric substances.

It will be readily understood that according to the desired industrial effect contemplated the method of this invention may be carried out under widely differing conditions without departing from the spirit and scope of the invention as set forth in the appended claim. Thus, variable gas quantities, and different temperature and pressure conditions may be used; besides, many structural or constructional details of the apparatus described hereinabove may be changed as well as the size and shapes of the members thereof (for example the filling rings) and/or their arrangement (assembling and interconnection of atomizers); finally, various mechanical elements may be replaced by other equivalent means.

The assembly comprising three reaction stages (Venturi tube, cyclone and diffusion tower) makes it possible to obtain yields higher than those provided by the combination of any two of its component elements, thereby affording a very high efficiency in the simultaneous scrubbing or cleaning of gases, liquids and solids, a result hitherto impossible to achieve by using separately each of these component elements.

What I claim is:

A method of purifying a gaseous current containing an aerosol to be removed which consists in mixing with turbulence said gaseous current with a liquid aerosol to agglomerate together said two aerosols in particles of a size sufficient to permit their removal, said liquid aerosol having the same particle diameter as the aerosol to be removed and being added thereto in a volume proportion of at least 1 to 1, 2 to 1, 5 to 1, 10 to 1, 25 to 1 and 100 to 1 for an average diameter of the particles to be removed of the order of 100, 25, 10, 1, 0.5 and 0.1 microns respectively.

(References on following page)

References Cited in the file of this patent

UNITED STATES PATENTS

| | | |
|---|---|---|
| 1,221,505 | Bradley et al. | Apr. 3, 1917 |
| 2,306,698 | Heller | Dec. 29, 1942 |
| 2,457,963 | Thodos | Jan. 4, 1949 |
| 2,535,700 | Seavey et al. | Dec. 26, 1950 |
| 2,598,304 | Richardson | May 27, 1952 |
| 2,611,680 | Ruth | Sept. 23, 1952 |
| 2,684,231 | Pomykala | July 20, 1954 |
| 2,689,973 | Lee et al. | Sept. 28, 1954 |
| 2,718,453 | Beckman | Sept. 20, 1955 |

FOREIGN PATENTS

| | | |
|---|---|---|
| 686,779 | Great Britain | Jan. 28, 1953 |